US007198569B2

(12) United States Patent
Wolf et al.

(10) Patent No.: US 7,198,569 B2
(45) Date of Patent: Apr. 3, 2007

(54) GAMING DEVICE WITH OPTIMAL AUTO-HOLD TABLES

(75) Inventors: Bryan D. Wolf, Reno, NV (US); Christopher T. Brune, Holly Springs, NC (US); Dwayne R. Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 708 days.

(21) Appl. No.: 10/255,864

(22) Filed: Sep. 26, 2002

(65) Prior Publication Data

US 2004/0063483 A1 Apr. 1, 2004

(51) Int. Cl.
*A63F 13/10* (2006.01)
*A63F 1/18* (2006.01)
*A63F 5/04* (2006.01)
*A63F 13/02* (2006.01)

(52) U.S. Cl. .............................. 463/9; 463/12; 463/13; 463/20; 463/22; 463/23; 463/25

(58) Field of Classification Search .................. 463/12, 463/23, 16, 20, 21, 22, 26, 31, 9, 13, 25; 273/292
See application file for complete search history.

(56) References Cited

U.S. PATENT DOCUMENTS 4,448,419 A * 5/1984 Telnaes ........................ 463/21
4,582,324 A 4/1986 Koza et al.
4,711,451 A * 12/1987 Pajak et al. .................... 463/22
5,033,744 A * 7/1991 Bridgeman et al. ........... 463/13
5,085,436 A * 2/1992 Bennett ........................ 463/21
5,102,137 A * 4/1992 Ekiert ..................... 273/143 R
5,108,099 A * 4/1992 Smyth .......................... 463/21
5,401,023 A * 3/1995 Wood ........................... 463/13
5,411,271 A * 5/1995 Mirando ......................... 463/9
5,511,781 A * 4/1996 Wood et al. .................. 463/13
5,511,784 A 4/1996 Furry et al.
5,704,835 A * 1/1998 Dietz, II ...................... 463/20
5,779,545 A 7/1998 Berg et al.
5,871,400 A 2/1999 Yfantis
5,873,781 A 2/1999 Keane
5,967,893 A 10/1999 Lawrence et al.

(Continued)

FOREIGN PATENT DOCUMENTS

GB 2 062 922 A * 5/1981

(Continued)

OTHER PUBLICATIONS

"The Book of Card Games," Peter Arnold, 1988, Barnes & Noble, Inc., New York, pp. 28-32.*

(Continued)

*Primary Examiner*—Xuan M. Thai
*Assistant Examiner*—Matthew D. Hoel
(74) *Attorney, Agent, or Firm*—Bell, Boyd & Lloyd LLP

(57) ABSTRACT

A gaming device which displays to a player the mathematically optimal or best way to play a game with minimal processing and memory usage. The game can be any version of video poker, slot game with a hold-a-reel feature, blackjack or other game with a finite number of outcomes after requiring the player to make choice of how to proceed. The present invention also includes the methods of how to make and use the auto-hold tables.

59 Claims, 14 Drawing Sheets

| MASTER TABLE WITH REDUNDANCY TABLE AS AUTO-HOLD TABLE | | |
|---|---|---|
| UNIQUE HAND NUMBER | GAME SITUATION | REDUNDANCY TABLE INDEX |
| 0 | 2(H) 3(H) 4(H) 5(H) 6(H) | 0 |
| 1 | 2(H) 3(H) 4(H) 5(H) 7(H) | 1 |
| 2 | 2(H) 3(H) 4(H) 5(H) 8(H) | 2 |
| • • • | • • • | • • • |
| • • • | • • • | • • • |
| 603,906 | 7(D) T(D) K(D) 4(H) A(H) | 60,134 |
| • • • | • • • | • • • |
| 608,534 | 7(S) T(S) K(S) 4(H) A(H) | 60,134 |
| • • • | • • • | • • • |
| 609,782 | 7(C) T(C) K(C) 4(H) A(H) | 60,134 |
| • • • | • • • | • • • |
| 2,598,959 | T(C) J(C) Q(C) K(C) A(C) | 134,458 |

U.S. PATENT DOCUMENTS

| | | | | | |
|---|---|---|---|---|---|
| 5,967,894 | A | * | 10/1999 | Kinoshita et al. | 463/13 |
| 6,024,642 | A | | 2/2000 | Stupak | |
| 6,062,981 | A | * | 5/2000 | Luciano, Jr. | 463/26 |
| 6,117,009 | A | * | 9/2000 | Yoseloff | 463/20 |
| 6,159,096 | A | * | 12/2000 | Yoseloff | 463/20 |
| 6,193,607 | B1 | | 2/2001 | Kay | |
| 6,196,547 | B1 | * | 3/2001 | Pascal et al. | 273/292 |
| 6,275,586 | B1 | | 8/2001 | Kelly | |
| 6,290,601 | B1 | | 9/2001 | Yamazaki et al. | |
| 6,343,989 | B1 | * | 2/2002 | Wood et al. | 463/23 |
| 6,347,795 | B1 | * | 2/2002 | De Leljer | 273/143 R |
| 6,422,940 | B1 | * | 7/2002 | Walker et al. | 463/13 |
| 6,477,251 | B1 | | 11/2002 | Szrek et al. | |
| 6,537,150 | B1 | | 3/2003 | Luciano et al. | |
| 6,884,168 | B2 | * | 4/2005 | Wood et al. | 463/23 |
| 6,923,719 | B2 | * | 8/2005 | Wolf | 463/16 |
| 2001/0003710 | A1 | * | 6/2001 | Abramopoulos et al. | 463/27 |
| 2001/0055989 | A1 | * | 12/2001 | Thomas | 463/16 |
| 2002/0019253 | A1 | * | 2/2002 | Reitzen et al. | 463/16 |
| 2002/0037762 | A1 | * | 3/2002 | Wood et al. | 463/13 |
| 2002/0103021 | A1 | * | 8/2002 | Wood et al. | 463/23 |
| 2002/0125641 | A1 | * | 9/2002 | Moody | 273/292 |
| 2004/0023713 | A1 | * | 2/2004 | Wolf et al. | 463/20 |
| 2006/0211471 | A1 | * | 9/2006 | Walker et al. | 463/16 |

FOREIGN PATENT DOCUMENTS

| | | | | |
|---|---|---|---|---|
| GB | 2 112 984 | A | * | 12/1981 |
| GB | 2 117 155 | A | * | 10/1983 |
| GB | 2 165 385 | A | * | 4/1986 |

OTHER PUBLICATIONS

"The Book of Card Games," Arnold, 1988, Barnes & Noble, Inc., New York, pp. 28-32.*

Oregon State Lottery, Division 200, General Video Lottery Rules, Printed Oct. 2, 2001.

* cited by examiner

FIG. 3

| POSSIBLE CARDS IN A SINGLE DECK, NO JOKER | | | | | | | | | | | | | |
|---|---|---|---|---|---|---|---|---|---|---|---|---|---|
| | 2 | 3 | 4 | 5 | 6 | 7 | 8 | 9 | 10 | JACK | QUEEN | KING | ACE |
| HEARTS | 2(H) | 3(H) | 4(H) | 5(H) | 6(H) | 7(H) | 8(H) | 9(H) | 10(H) | J(H) | Q(H) | K(H) | A(H) |
| DIAMONDS | 2(D) | 3(D) | 4(D) | 5(D) | 6(D) | 7(D) | 8(D) | 9(D) | 10(D) | J(D) | Q(D) | K(D) | A(D) |
| SPADES | 2(S) | 3(S) | 4(S) | 5(S) | 6(S) | 7(S) | 8(S) | 9(S) | 10(S) | J(S) | Q(S) | K(S) | A(S) |
| CLUBS | 2(C) | 3(C) | 4(C) | 5(C) | 6(C) | 7(C) | 8(C) | 9(C) | 10(C) | J(C) | Q(C) | K(C) | A(C) |

FIG. 6A

| MASTER TABLE AS AUTO-HOLD TABLE | | | | | | |
|---|---|---|---|---|---|---|
| UNIQUE HAND NUMBER | GAME SITUATION | HOLD CODE (hold = 1, return = 0) | | | | |
| 0 | 2(H) 3(H) 4(H) 5(H) 6(H) | 1 | 1 | 1 | 1 | 1 |
| 1 | 2(H) 3(H) 4(H) 5(H) 7(H) | 1 | 1 | 1 | 1 | 0 |
| 2 | 2(H) 3(H) 4(H) 5(H) 8(H) | 1 | 1 | 1 | 1 | 0 |
| ••• | ••• | ••• | ••• | ••• | ••• | ••• |
| ••• | ••• | ••• | ••• | ••• | ••• | ••• |
| 603,906 | 7(D) T(D) K(D) 4(H) A(H) | 0 | 1 | 1 | 0 | 0 |
| ••• | ••• | ••• | ••• | ••• | ••• | ••• |
| ••• | ••• | ••• | ••• | ••• | ••• | ••• |
| 2,598,959 | T(C) J(C) Q(C) K(C) A(C) | 1 | 1 | 1 | 1 | 1 |

FIG. 6B

| MASTER TABLE AS AUTO-HOLD TABLE (unique hand number implicit in table) | | | | |
|---|---|---|---|---|
| HOLD CODE (hold = 1, return = 0) | | | | |
| 1 | 1 | 1 | 1 | 1 |
| 1 | 1 | 1 | 1 | 0 |
| 1 | 1 | 1 | 1 | 0 |
| ••• | ••• | ••• | ••• | ••• |
| ••• | ••• | ••• | ••• | ••• |
| 0 | 1 | 1 | 0 | 0 |
| ••• | ••• | ••• | ••• | ••• |
| ••• | ••• | ••• | ••• | ••• |
| 1 | 1 | 1 | 1 | 1 |

FIG. 7A

| MASTER TABLE WITH REDUNDANCY TABLE AS AUTO-HOLD TABLE | | |
|---|---|---|
| UNIQUE HAND NUMBER | GAME SITUATION | REDUNDANCY TABLE INDEX |
| 0 | 2(H) 3(H) 4(H) 5(H) 6(H) | 0 |
| 1 | 2(H) 3(H) 4(H) 5(H) 7(H) | 1 |
| 2 | 2(H) 3(H) 4(H) 5(H) 8(H) | 2 |
| • • • | • • • | • • • |
| • • • | • • • | • • • |
| 603,906 | 7(D) T(D) K(D) 4(H) A(H) | 60,134 |
| • • • | • • • | • • • |
| 608,534 | 7(S) T(S) K(S) 4(H) A(H) | 60,134 |
| • • • | • • • | • • • |
| 609,782 | 7(C) T(C) K(C) 4(H) A(H) | 60,134 |
| • • • | • • • | • • • |
| 2,598,959 | T(C) J(C) Q(C) K(C) A(C) | 134,458 |

FIG. 7B

| **REDUNDANCY TABLE AS AUTO-HOLD TABLE** | | | | | |
|---|---|---|---|---|---|
| REDUNDANCY TABLE INDEX | HOLD CODE (hold =1, return =0) | | | | |
| 0 | 1 | 1 | 1 | 1 | 1 |
| 1 | 1 | 1 | 1 | 1 | 0 |
| 2 | 1 | 1 | 1 | 1 | 0 |
| • • • | • • • | | | | |
| • • • | • • • | | | | |
| 60,134 | 0 | 1 | 1 | 0 | 0 |
| • • • | • • • | | | | |
| 134,458 | 1 | 1 | 1 | 1 | 1 |

FIG. 7C

| MASTER TABLE WITH REDUNDANCY TABLE AS AUTO-HOLD TABLE (unique hand number implicit in table) |
|---|
| REDUNDANCY TABLE INDEX |
| 0 |
| 1 |
| 2 |
| • • • |
| • • • |
| 60,134 |
| • • • |
| 60,134 |
| • • • |
| 60,134 |
| • • • |
| 134,458 |

FIG. 7D

| REDUNDANCY TABLE AS AUTO-HOLD TABLE (redundancy table index implicit in table) | | | | |
|---|---|---|---|---|
| HOLD CODE (hold =1, return =0) | | | | |
| 1 | 1 | 1 | 1 | 1 |
| 1 | 1 | 1 | 1 | 0 |
| 1 | 1 | 1 | 1 | 0 |
| • • • | | | | |
| • • • | | | | |
| 0 | 1 | 1 | 0 | 0 |
| • • • | | | | |
| 1 | 1 | 1 | 1 | 1 |

FIG. 8A

EXAMPLE PAY TABLES

| SINGLE DECK, NO JOKER PAY TABLE 1 | |
|---|---|
| **WINNING CARD COMBINATIONS** | **PAYOUT** |
| ROYAL FLUSH [I.E., 10(S) J(S) Q(S) K(S) A(S)] | 250 |
| STRAIGHT FLUSH [I.E., 4(D) 5(D) 6(D) 7(D) 8(D) | 50 |
| FOUR OF A KIND [I.E., 6(H) 7(H) 8(H) 9(H) J(H) | 25 |
| FULL HOUSE [I.E., 5(H) 5(D) 5(S) 8(C) 8(H)] | 8 |
| FLUSH [I.E., 4(H) 5(H) J(H) 2(H) 7(H)] | 6 |
| STRAIGHT [I.E., 4(H) 5(D) 6(C) 7(S) 8(H) | 4 |
| THREE OF A KIND [I.E., 10(S) 10(H) 10(D) 3(H) Q(D)] | 3 |
| TWO PAIR [I.E., 7(C) 7(H) J(S) J(D) 5(C)] | 2 |
| JACKS OR BETTER [I.E., J(S) J(C) OR K(H) K(D)] | 1 |

FIG. 8B

EXAMPLE PAY TABLES

| SINGLE DECK, NO JOKER PAY TABLE 2 | |
|---|---|
| **WINNING CARD COMBINATIONS** | **PAYOUT** |
| ROYAL FLUSH [I.E., 10(S) J(S) Q(S) K(S) A(S)] | 500 |
| STRAIGHT FLUSH [I.E., 4(D) 5(D) 6(D) 7(D) 8(D) | 50 |
| FOUR ACES [I.E., A(H) A(D) A(C) A(S) 8(H)] | 160 |
| FOUR OF A KIND [I.E., 6(H) 7(H) 8(H) 9(H) J(H) | 25 |
| FULL HOUSE [I.E., 5(H) 5(D) 5(S) 8(C) 8(H)] | 8 |
| FLUSH [I.E., 4(H) 5(H) J(H) 2(H) 7(H)] | 6 |
| STRAIGHT [I.E., 4(H) 5(D) 6(C) 7(S) 8(H) | 4 |
| THREE OF A KIND [I.E., 10(S) 10(H) 10(D) 3(H) Q(D)] | 3 |
| TWO PAIR [I.E., 7(C) 7(H) J(S) J(D) 5(C)] | 2 |
| JACKS OR BETTER [I.E., J(S) J(C) OR K(H) K(D)] | 1 |

FIG. 8C

EXAMPLE PAY TABLES

| THREE REEL, SINGLE PAYLINE SLOT GAME PAY TABLE | |
|---|---|
| WINNING SYMBOL COMBINATIONS | PAYOUT |
| 3 “7” SYMBOLS | 100 |
| 3 HEART SYMBOLS | 75 |
| 2 “7” SYMBOLS AND A HEART SYMBOL | 50 |
| ANY 2 “7” SYMBOLS | 25 |
| ANY 2 HEART SYMBOLS | 16 |
| 3 CHERRIE SYMBOLS | 8 |
| 3 BAR SYMBOLS | 4 |
| ANY 2 CHERRIE SYMBOLS | 2 |
| ANY 2 BAR SYMBOLS | 1 |

GAMING DEVICE WITH OPTIMAL AUTO-HOLD TABLES

CROSS REFERENCES TO RELATED APPLICATION

This application is related to the following commonly-owned co-pending patent application: "METHOD FOR REPRESENTING A GAME AS A UNIQUE NUMBER," Ser. No. 10/066,496, filed on Dec. 15, 2001.

BACKGROUND OF THE INVENTION

Contemporary gaming machines such as card games are known. In card games such as video poker, the gaming machines deal hands to a player. Depending upon which cards are in a player's hand, the player may win a value. When the gaming machine provides a hand to the player, the gaming machine typically enables the player to keep the initial cards in the hand and receive the value associated with these cards or give up one or more cards in exchange for new cards. The player's goal is to maximize the opportunity to gain value by holding certain cards and getting new cards.

Certain known gaming machines employ an auto-hold program which informs the player as to which cards to hold for optimal play. The gaming machine processor executing this auto-hold program compares in an iterative manner the initial cards in the hand to a plurality of card patterns. Each card pattern is associated with a predetermined hold pattern, typically determined by the heuristics or experience of successful poker players, such as hold all five cards when they are a straight, hold the three cards when they are three kings or discard all cards. When the dealt hand matches a card pattern in the auto-hold program, the gaming machine indicates to the player which cards to hold in accordance with the heuristics in the auto-hold program.

Similarly, certain known gaming devices enable a player to hold certain reels in a slot game to increase the player's chance to obtain a winning combination on the next spin. In this case, after a spin the processor of the gaming device compares in an iterative manner the symbol combination to a plurality of symbol combinations. Each symbol pattern is associated with a predetermined hold pattern, typically determined by the heuristics or experience of successful slot players. Once the hold pattern associated with that particular set of symbol positions is determined, the gaming device indicates to the player which reels to hold.

The heuristics employed by these gaming devices is substantially accurate, and when wrong, the particular hold pattern is only off, if at all, by a relatively minor amount. To increase player enjoyment and excitement, it is desirable to provide players with new gaming devices providing mathematically precise auto-holds that minimize processing and memory usage.

SUMMARY OF THE INVENTION

The present invention provides a gaming device that determines and displays mathematically precise suggestions of the optimal or best way to play a game for every game situation. The gaming device uses an auto-hold table in the form of a master table or a redundancy table in conjunction with a master table to determine the mathematically best or optimal suggestion for obtaining the best result. The use of the auto-hold table enables the gaming device to minimize the use of processing and memory. The present invention also includes the methods of creating and using the auto-hold table. These methods also minimize the use of processing and memory.

In one embodiment, the gaming device displays a video poker game. The gaming device randomly determines and deals or displays five cards to a player. The gaming device processor then converts the dealt hand or initial cards in the hand into a hand number unique to that hand using a process as disclosed in U.S. patent application Ser. No. 10/066,496 filed on Dec. 15, 2001, which is incorporated herein by reference. Next, the gaming device processor looks up a hold code associated with that hand number in a predetermined master table. The hold code for each hand number provides the optimal or best mathematical suggestion for achieving the best result after the draw. The gaming device then displays to the player which cards to hold in accordance with the hold code. The player may or may not follow this suggestion. In other embodiments, the game is one of several other possible games such as a slot type game, blackjack, other card games, or other suitable game.

In another embodiment, the gaming device uses a redundancy table in coordination with a master table to provide mathematically precise suggestions of how to play a game. In one embodiment, the game is video poker and the gaming device randomly determines and deals or displays a five card hand to a player. The gaming device then converts the dealt hand into a unique hand number and looks up in the master table a redundancy table index associated with the hand number. The gaming device then looks up the hold code stored in the redundancy table corresponding to the redundancy table index. The gaming device uses that hold code to display to the player the mathematically optimal or best cards to hold to obtain the best result after the draw. The player may or may not follow this suggestion.

The present invention also includes the methods of producing the master and redundancy tables used by the gaming devices pursuant to the present invention. In one embodiment, the methods include making one time calculations corresponding to every possible set of cards to hold for every possible hand or game situation and calculating every possible outcome for every possible set of cards held. The set of cards to hold that produced the mathematically precise optimal outcome for each hand is converted into a five bit code, called a hold code, and recorded in either the master table or redundancy table. Once recorded, the gaming device only needs to look up the hold code associated with each dealt hand to determine the optimal or best suggestion of cards to hold for the player. No further processing is needed.

Further, the redundancy table capitalizes on the fact that some hands that differ only by suit also have the same hold codes. As such, the hold codes can be stored in a redundancy table that is much smaller than the master table. For example, the redundancy table for a conventional, no joker, single deck of fifty-two cards is nineteen times smaller than the master table for that deck. Each different game or pay table for a particular deck of cards or set of slot reels will have a different redundancy table. However, only one master table is needed for each deck of cards or set of slot reels. Thus, the master table for each deck of cards or set of slot reels need only be created once and stored only once in the gaming device memory. The gaming device will then store a separate and smaller redundancy table for each game or pay table available for play with that deck of cards or set of slot reels. This configuration is advantageous because less processing is needed to create the tables and less memory is needed to store the mathematically precise hold codes for every variation of game and pay table available on the particular gaming device.

It is therefore an advantage of the present invention to provide a gaming device providing mathematically precise suggestions of the optimal or best way to play a game using a minimum of processing and memory.

A further advantage of the present invention is to provide a method for creating the auto-hold table which minimizes the needed amount of memory and processing.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 3 is a table which illustrates the possible cards in a conventional no joker, single deck of cards.

FIGS. 6A and 6B are tables which illustrate an example auto-hold table of the present invention.

FIGS. 7A, 7B, 7C and 7D are tables which illustrate examples of an auto-hold table in the form of a redundancy table.

FIGS. 8A, 8B and 8C are tables which illustrate example pay tables.

DETAILED DESCRIPTION OF THE INVENTION

Gaming Device and Electronics

Figure 1A:
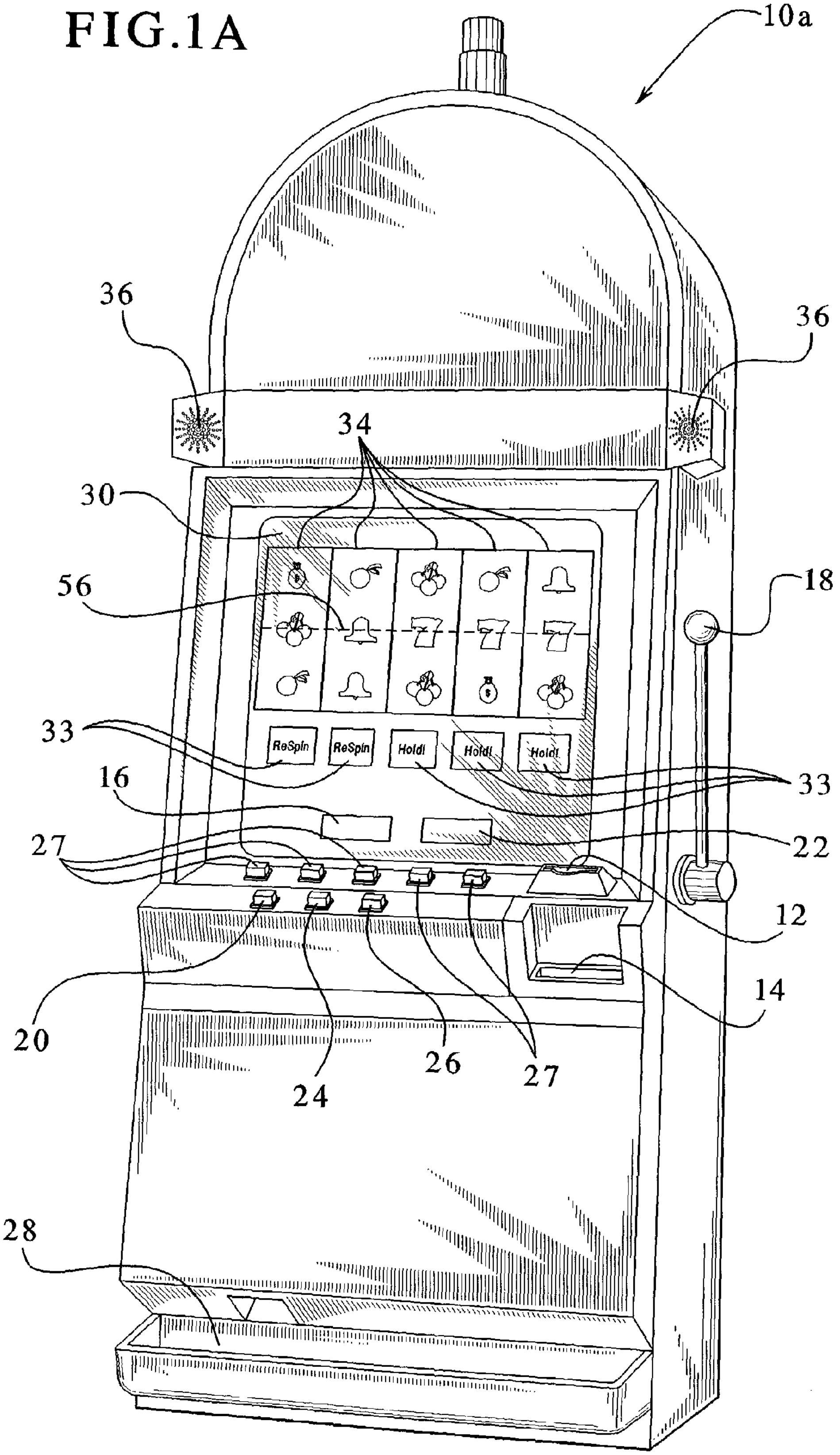
FIG. 1A is a perspective view of one embodiment of the gaming device of the present invention.
Figure 1B:
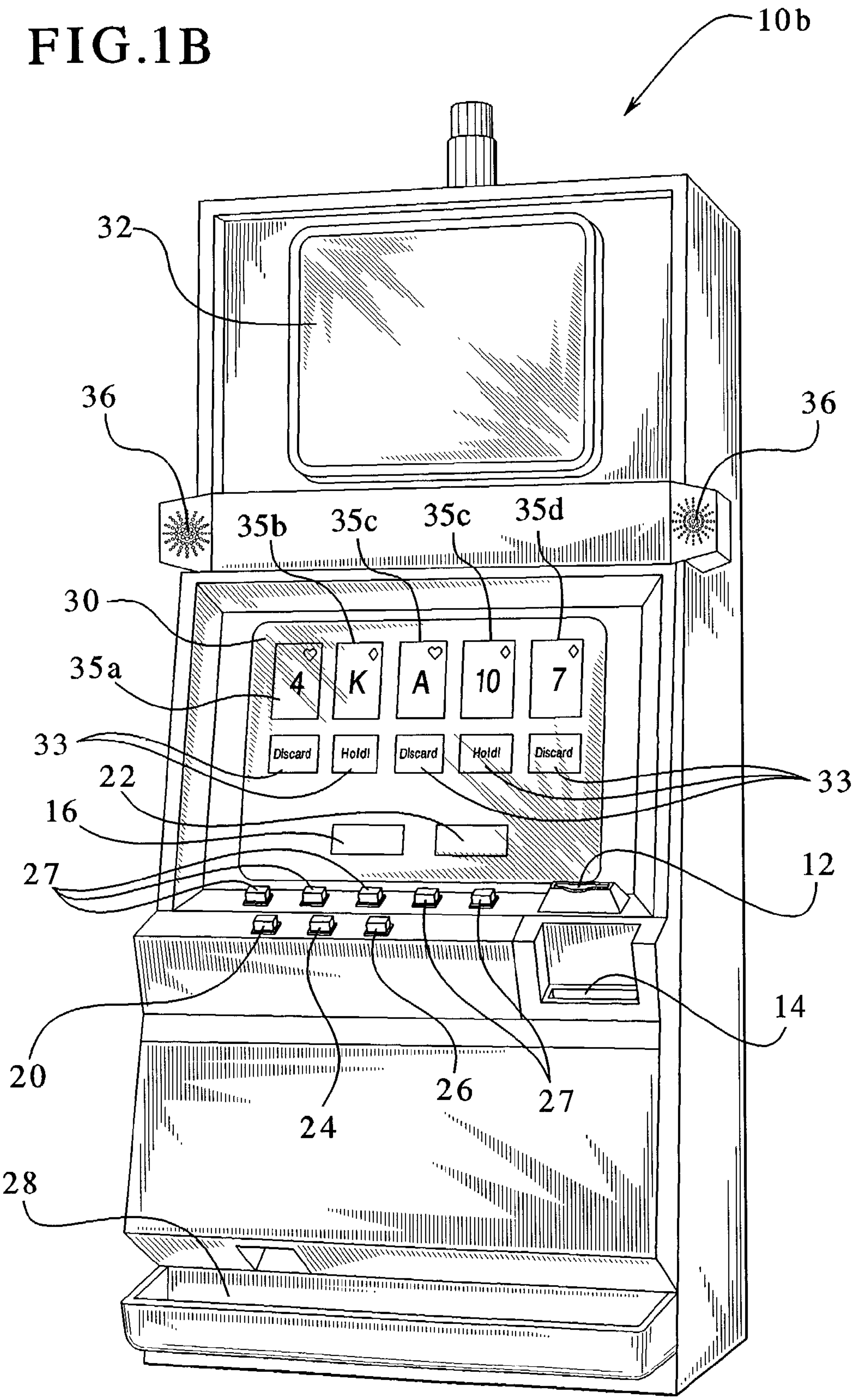
FIG. 1B is a perspective view of one embodiment of the gaming device of the present invention.

Referring now to the drawings, two embodiments of the gaming device of the present invention are illustrated in FIGS. 1A and 1B as gaming device 10*a* and 10*b*, respectively. Gaming device 10*a* and gaming device 10*b* are generally referred to herein as gaming device 10. Gaming device 10 is constructed so that a player can operate it while standing or sitting. It should be appreciated that gaming device 10 can be constructed as a pub-style table-top game (not shown) which a player can operate preferably while sitting. Furthermore, gaming device 10 can be constructed with varying cabinet and display designs. Gaming device 10 can incorporate any game apparatus for operating any game such as slot, blackjack, poker and keno, any of their bonus triggering events and any of their secondary and bonus round games. The symbols and indicia used on and in gaming device 10 may be in mechanical, electrical or video form.

As illustrated in FIGS. 1A and 1B, gaming device 10 includes a coin slot 12 and a bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing deal or play button 20.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, but other embodiments such as the one illustrated in FIG. 1B can include a central display device 30 and an upper display device 32. Gaming device 10*a* displays a plurality of reels 34, such as three to five reels 34 in mechanical or video form in the display device 30. A display device can be any viewing surface such as glass, a video monitor or screen, a liquid crystal display or any other display mechanism.

A slot machine game of gaming device 10 as shown in FIG. 1A preferably displays a plurality of reels 34, such as three to five reels 34, in mechanical or video form on one or more of the display devices. Each reel 34 displays a plurality of indicia such as bells, hearts, fruits, numbers, letters, bars or other images which preferably correspond to a theme associated with gaming device 10. If the reels 34 are in video form, the display device displaying the video reels 34 is preferably a video monitor.

Similarly, if the game is card based such as video poker or blackjack, the display device is preferably a video monitor as shown in FIG. 1B. The cards 35 are associated with one or more decks of cards used in conventional poker games as shown in FIG. 3 including any wild cards. For the purposes of this application, card values will be referred to as shown in FIG. 3. For example, the card showing a Jack of Spades will referred to as J(S). The cards 35 may further display a variety of images such as bells, hearts, fruits, numbers, letters or other images which may correspond to a theme associated with the gaming device 10. Furthermore, each gaming device 10 includes speakers 36 for making sounds or playing music.

Figure 2:
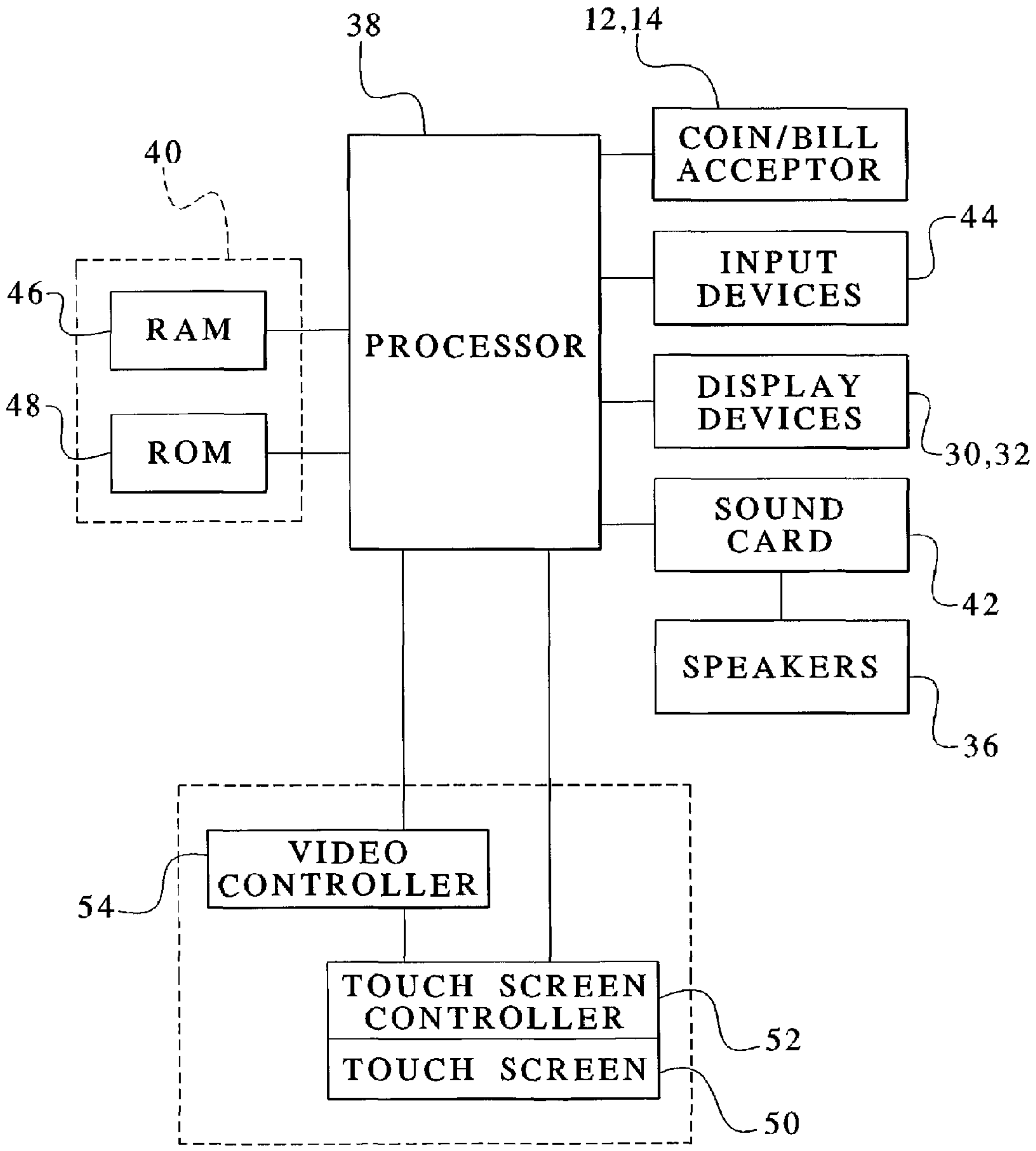
FIG. 2 is a schematic block diagram of the electronic configuration of one embodiment of the gaming device of the present invention.

As illustrated in FIG. 2, the general electronic configuration of gaming device 10 preferably includes: a processor 38; a memory device or data storage device 40 for storing program code or other data including at least one auto-hold table in the form of a master table and/or a redundancy table; a display device 30; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The data storage device 40 can include random access memory (RAM) 46 for storing event data or other data generated or used during a particular game. The data storage device 40 can also include read only memory (ROM) 48. ROM 48 preferably stores program code which controls the gaming device 10 so that it plays a particular game in accordance with applicable game rules and pay tables. ROM 48 also preferably stores the hold codes in the form of at least one predetermined auto-hold table that is employed by the processor to display the mathematically optimal or best suggestions of how to play the game.

As further illustrated in FIG. 2, the player preferably uses the input devices 44, such as pull arm 18, deal or play button 20, the bet one button 24, the cash out button 26 and the hold buttons 27 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate locations. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and data storage device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and data storage device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are at times generally referred to herein as the "computer"or "controller."

With reference to FIG. 1A, to operate gaming device 10 in the slot game embodiment, the player must insert the appropriate amount of money, tokens or other currency at coin slot 12 or bill acceptor 14 and then pull the arm 18 or push the deal or play button 20. The reels 34 will then begin to spin. Eventually, the reels 34 will come to a stop. Depending upon where the reels 34 stop, the player may reach an award outcome and win additional credits, or the player may reach a non-award outcome and win no credits. In a preferred embodiment, the player may choose to hold one or more of the reels 34 and re-spin the other reels 34. Gaming device 10 can determine the mathematically optimal or best reels to hold, display this suggestion 33 to the player and in some embodiments automatically hold those reels for the player. The player may choose to hold the reels 34 selected by gaming device 10 or select other reels 34 to hold for the subsequent spin of the reels 34 by pressing related hold buttons 27 or the touch screen 50. The final position of reels 34 is compared to a pay table such as illustrated in FIG. 8C, and the appropriate award is provided to the player.

Similarly, with reference to FIG. 1B, to operate gaming device 10 in the video poker embodiment, the player must insert the appropriate amount of money or tokens at coin slot 12 or bill acceptor 14 and then push the deal or play button 20. Gaming device 10 allows the player to play a conventional game of video poker and initially deals five cards 35 all face up from a single fifty-two card deck. If the player wishes to draw, the player selects the cards 35 to hold by pressing related hold buttons 27 or the touch screen 50.

In a preferred embodiment, the processor of gaming device 10 automatically determines which are the mathematically optimal or best cards 35 to hold, displays this suggestion 33 to the player and in some embodiments automatically holds these cards 35 for the player. The player may choose to hold the cards 35 selected by gaming device 10 or select other or no cards 35 to hold. The player then presses the deal button 20 and the unwanted cards 35 are removed from the display 30 and replacement cards 35 are dealt from the remaining cards in the deck. This results in a final five-card hand 35. The final five-card hand 35 is compared to a pay table, such as those illustrated in FIGS. 8A and 8B, which utilizes conventional poker hand rankings to determine the winning hands. The player is provided with an award based on a winning hand and the credits the player wagered.

It should be appreciated that there may be additional variations of poker games such as a hand having a different number of cards, multiple hands simultaneously played, or variations of conventional poker hand rankings which gaming device 10 can be adapted to play. It should also be appreciated that other card-based games such as blackjack could be used as a primary or base game.

In addition to winning credits in this manner, gaming device 10 may also give players the opportunity to win credits in a secondary game, such as a bonus round. This type of gaming device 10 will include a program which will automatically begin a bonus round when the player has achieved a qualifying condition in the game. This qualifying condition can be a particular arrangement of one or more indicia on a display device. The gaming device 10 may use a video-based display device 30 to enable the player to play the bonus round. As illustrated in the five reel slot game shown in FIG. 1A, the qualifying condition could be the number seven appearing on three or more adjacent reels 34 along a payline 56, or the qualifying condition could be a straight occurring in a video poker game as illustrated in FIG. 4C. It should be appreciated that the present invention can include one or more paylines, such as payline 56, wherein the paylines can be horizontal, diagonal or any combination thereof.

Auto-Hold Feature

Figure 4A:
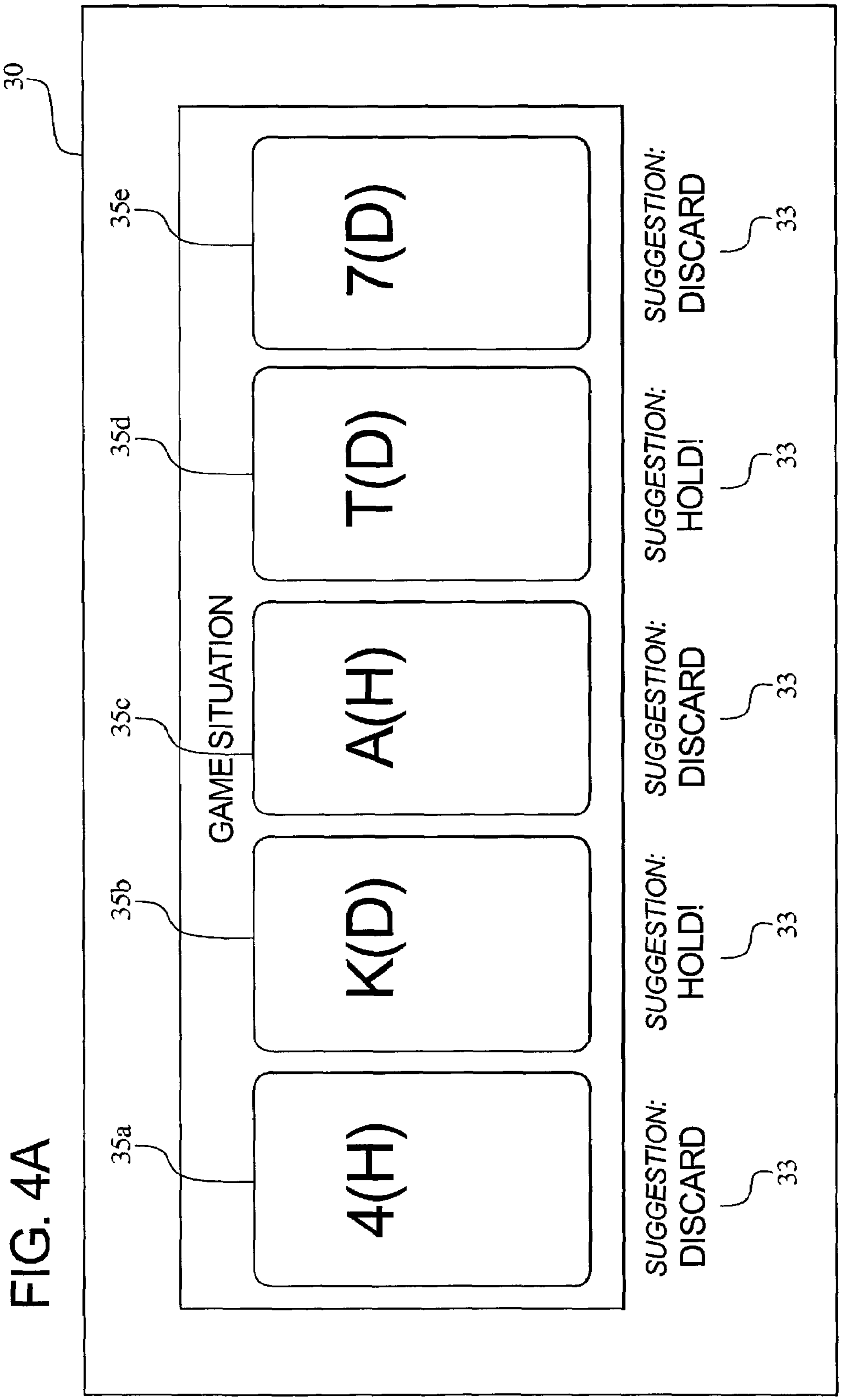
FIGS. 4A, 4B and 4C are plan views of a video poker embodiment of the gaming device of the present invention, illustrating a game situation, an ordered game situation, and game outcome.
Figure 5:
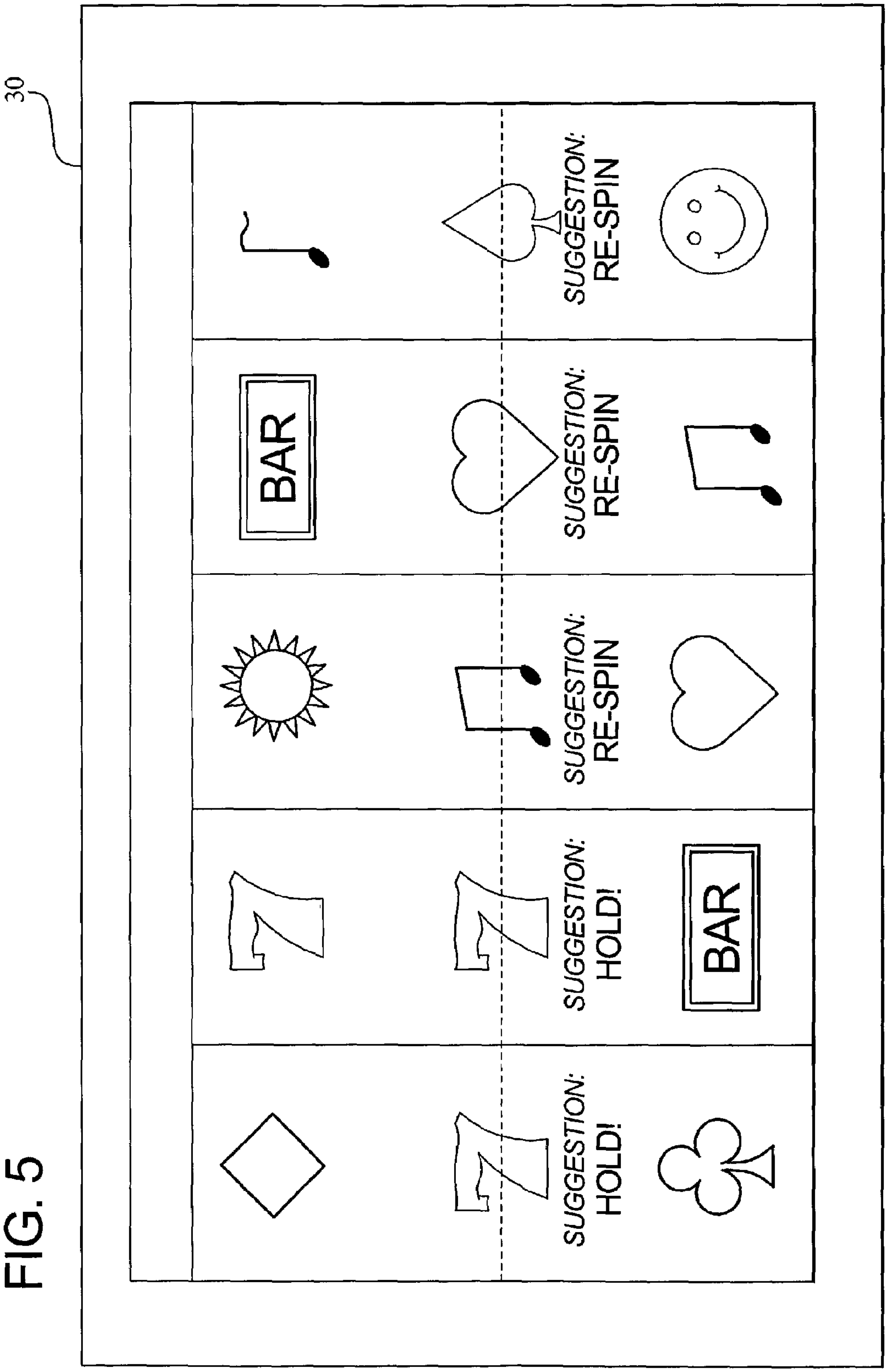
FIG. 5 is a plan view of a slot-type game embodiment of the gaming device of the present invention, illustrating a game situation.

As illustrated in FIGS. 4A and 5, gaming device 10 displays to the player and in certain embodiments automatically holds for the player the mathematically optimal or best cards or reels to hold to achieve the optimal or best outcome. As illustrated in FIG. 4A, in one embodiment, gaming device 10 randomly selects and displays five cards 35*a* through 35*e* creating a game situation. Using processor 38, gaming device 10 converts the dealt five card hand into a unique hand number. Every possible hand has a unique hand number. Similarly, in the slot machine embodiment, every possible symbol combination has an associated unique number. It should be appreciated that any suitable method can be employed to determine the unique number for a hand or symbol combination any suitable method such as the method disclosed in U.S. patent application Ser. No. 10/066,496, filed on Dec. 15, 2001. Gaming device 10 uses the unique number as an index to look up a hold code associated with that hand in a predetermined master table stored in the data storage device 40.

As shown in FIGS. 6A, 6B, and 7A through 7D, in the five card poker embodiment the hold code is a five bit code where each bit represents one card in the dealt hand. Each bit is either a zero or a one. A one represents that the card corresponding to that bit should be held. A zero represents that the card corresponding to that bit should be discarded. Thus, in a single five bit code corresponding to a single five card hand, each card is marked either to be held or discarded. It should be appreciated that the hold code can be any number of bits corresponding to the number of cards or reels the player may choose to hold.

Figure 4B:
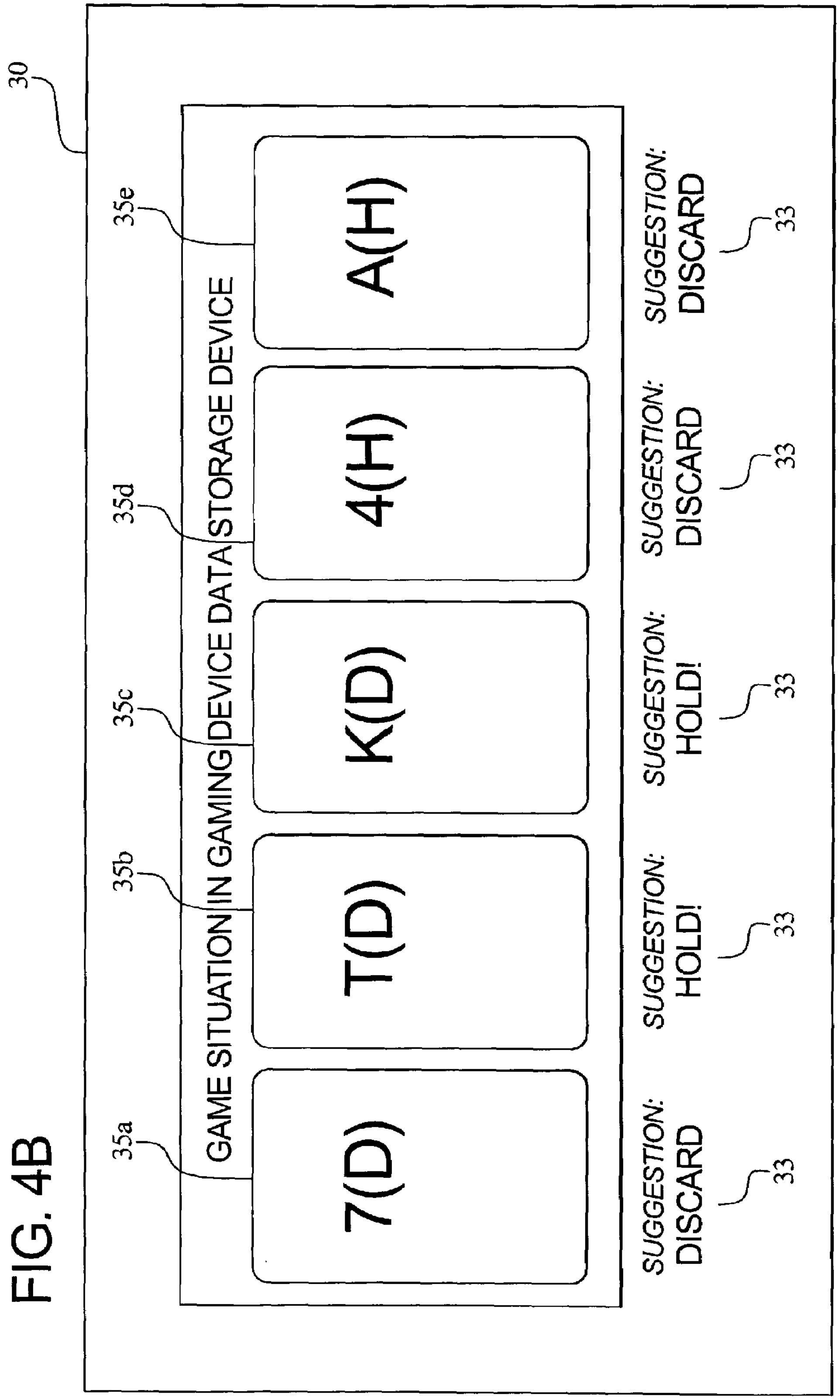
Figure 4C:
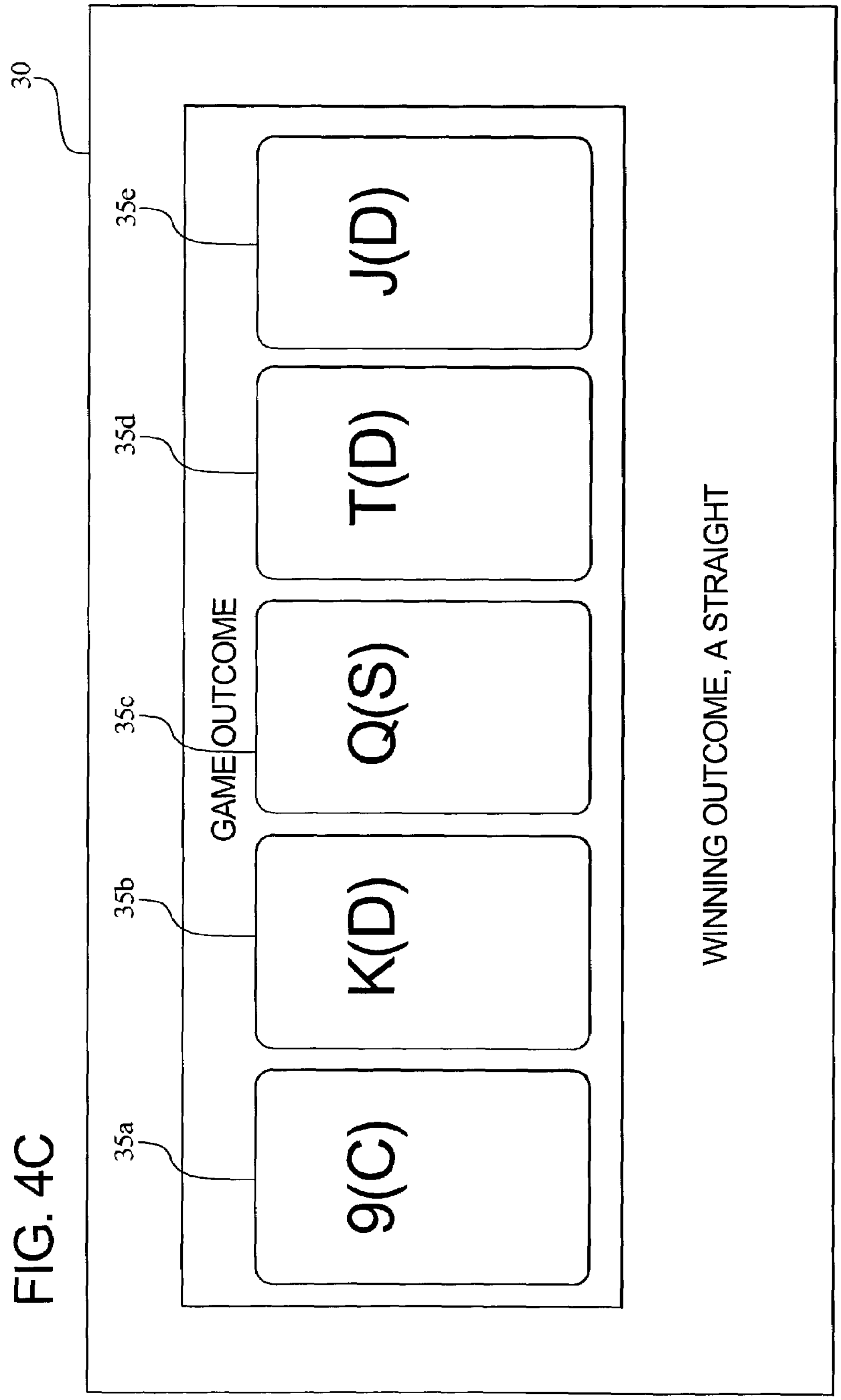

The hold code for every hand requires the cards in the dealt hand to be placed in a certain order to eliminate the need for separate hold codes for every combination of the same five cards, thus reducing the use of memory. For example, the cards could be ordered according to the following system. First, the suits are ordered according to which suit has the most cards in the hand. In the case where two suits have the same number of cards, the suit with the highest numbered card is placed first. If two suits have the same number of cards and the same face values, it does not matter which suit is placed first. Then, within each suit, the cards are ordered according to their face value from lowest to highest. As shown in FIGS. 4A and 4B, using this ordering system gaming device 10 reorders the card combination or elements of the game situation from 4(H) K(D) A(H) T(D) 7(D) to 7(D) T(D) K(D) 4(H) A(H) in data storage device 40.

Therefore, in a preferred embodiment, when gaming device 10 compares the dealt hand or game situation to the hold code, first the dealt cards are reordered and stored in the data storage device 40 without disturbing the order of the cards 35 displayed to the player. Then gaming device 10 uses the processor to look up the hold code associated with the ordered hand or game situation in the auto-hold table as illustrated in FIG. 6. Gaming device 10 then uses the hold code to display to the player the best or optimal cards to hold and, in some embodiments, automatically holds these cards for the player. The player may choose to use the suggestions of gaming device 10 or choose other cards 35 to hold.

In another embodiment, gaming device 10 enables a player to play different games with or apply different pay tables to the same deck of cards 35 or set of slot reels 34. In this embodiment, it is advantageous to use a redundancy table as the auto-hold table in addition to a master table. Because several poker hands differ only by suit and have identical hold codes, memory can be saved by storing only one hold code for all of the redundant hands in a redundancy table as shown in FIGS. 7A and 7B. The master table in this embodiment stores an index to the redundancy table associated with every possible hand. By doing so, a redundancy table for a conventional no joker, single deck of fifty-two cards is nineteen times smaller than the master table for the same deck of cards.

For example, gaming device 10 randomly displays five cards to a player creating a game situation. Next, the dealt cards are elements that are reordered in the data storage device 40 without disturbing the of order of the cards 35 displayed to the player. Next, gaming device 10 determines the unique hand number for the dealt hand or game situation. Using the hand number, the processor of gaming device 10 retrieves from in the master table the redundancy table index for the given hand number. Then using the redundancy table index, the processor of gaming device 10 retrieves the hold code for the dealt hand or game situation in the redundancy table. Finally, the processor 38 of gaming device 10 uses the hold code to display 33 to the player which cards to hold.

In another embodiment, gaming device 10 enables a player to play different games or use different pay tables for the same deck of cards or set of slot reels or suggestion strategies for the same game or paytable. For the purposes of this application, a deck of cards or set of slot reels is referred to as a game apparatus, and different games or pay tables played with a game apparatus are referred to as game versions. Every game version associated with a game apparatus has a different auto-hold table in the form of a redundancy table because the different games or pay tables may have different mathematically precise hold codes for the same hand or symbol combination. Despite the need for different redundancy tables, each game apparatus has a single master table. Thus, the amount of memory necessary to store the mathematically optimal or best suggestions for every game version and hold strategy is minimized.

For example, gaming device 10 enables a player to choose from three different decks to use to play video poker: no joker, single deck; no joker, three decks; and two joker, single deck. In addition, gaming device 10 enables the player to choose whether or not to have deuces wild in the no joker decks and to choose one of three different pay tables to apply to each game. Thus, in this example, gaming device 10 enables the player to play one of fifteen different games. However, gaming device 10 only stores three master tables and fifteen different auto-hold tables in the form of redundancy tables in its data storage device 40 instead of fifteen different master or auto-hold tables. Because the redundancy tables are about nineteen times smaller than the master tables, gaming device 10 can store all the redundancy tables in this example in an amount of memory smaller than that needed for one master table.

In another embodiment, gaming device 10 enables a player to choose from two or more hold strategies to apply to a game. In this embodiment, a separate auto-hold table in the form of a redundancy table is required for each hold strategy, whether it be a risky, moderate, or conservative strategy. A first redundancy table may be created to provide hold codes for a risky strategy to maximize the amount of value possible in the draw. A second redundancy table may be created to provide hold codes for a conservative strategy to maximize the chance of obtaining any winning card combination in the draw. For example, if gaming machine 10 deals the cards 10(S) J(H) Q(H) K(H) A(H), the first redundancy table will provide a hold code of 0 1 1 1 1 because a much higher payoff can be awarded when a royal flush is drawn instead of a straight. However, the second redundancy table will provide a hold code of 1 1 1 1 1 because this hold code guarantees a winning card combination, here a straight. The player may choose which hold strategy to use prior to play or after the initial cards are dealt.

Method of Creating Auto-Hold Tables

The present invention further includes the methods used to create the auto-hold tables used by gaming device 10. An auto-hold table is the table that stores the hold codes for a particular game or pay table. In the present invention, the master table is an auto-hold table when used without a redundancy table; however, when used, the redundancy table is an auto-hold table.

When using a redundancy table with a master table, the master table is created using the following method. The first step in the method includes setting the Hand Number and Redundancy Table Index to zero. The next step of the method includes converting the Hand Number to a hand or game situation any suitable method such as the method disclosed in U.S. patent application Ser. No. 10/066,496, filed on Dec. 15, 2001. Then, the method includes changing the suits of the hand or game situation in every possible way. For a game situation that has only one suit, this step includes changing the cards of the suit to each of the four suits. For a game situation with all four suits there are twenty-four different suit combinations. For each new hand generated when changing the suits, the New Hand Number is found any suitable method such as the method disclosed in U.S. patent application Ser. No. 10/066,496, filed on Dec. 15, 2001.

According to the method, if the New Hand Number is less than the current Hand Number, the Redundancy Table Index for the New Hand Number is retrieved and stored in the master table under the index of the Hand Number. The method then includes incrementing the Hand Number and repeating the method starting with the step of converting the Hand Number to a hand or game situation.

According to the method, if no New Hand Numbers are lower than the current hand number, the current Redundancy Table Index is stored in the master table under the index of the Hand Number. Then the method includes incrementing the Hand Number and Redundancy Table Index and repeating the method starting with the step of converting the Hand Number to a hand or game situation.

The above steps are repeated until the Hand Number reaches the number of possible hands. At this point the master table for use with a redundancy table has been created.

The method used to create an auto-hold table providing the hold codes for the best expected value for each game situation includes the following steps. First the method includes creating a temporary pay table. A pay table as shown in FIGS. 8A, 8B, and 8C is created by assigning a payout value to every possible final hand or game outcome. After creating the temporary pay table, the method includes adding the payouts for every game outcome; this value is the Total Payout.

To start building the auto-hold table, the method includes starting with the auto-hold table's first entry. If the auto-hold table is a master table, the method includes converting the index number of the entry into a hand or game situation using any suitable method such as the method disclosed in U.S. patent application Ser. No. 10/066,496, filed on Dec. 15, 2001. If the auto-hold table is a redundancy table, the method includes finding an entry in the master table that corresponds to that redundancy table index, and then the master table entry is converted into a hand or game situation.

Next, the method includes applying every possible hold code to the hand or game situation except for hold code 0 0 0 0 0, for example 0 0 0 0 1, 0 0 0 1 1, etc. As each hold code is applied, the method includes calculating every possible outcome of the draw for that particular hold code. Next, the method includes adding the payouts for every possible outcome for that particular hold code and dividing by the total number of possible outcomes for that hold code. This value is the Expected Value for that hold code.

The method of creating the auto-hold tables also includes computing the Expected Value for the hold code indicating to hold nothing or 0 0 0 0 0. To compute this Expected Value, the method includes adding all the payouts for the other possible hold codes; this value is the Total Payouts For This Hand. The method then includes subtracting the Total Payouts For This Hand from the Total Payouts and then dividing this value by the total number of outcomes for hold code 0 0 0 0 0; this value is the Expected Value for hold code 0 0 0 0 0. The method of creating the auto-hold table includes storing in the table the hold code with the highest Expected Value for each game situation and repeating the above process for each auto-hold table index until the table is complete.

For example, the method can be demonstrated to calculate the Expected Value for the hand or game situation 4(H) A(H) K(S) T(S) J(S). First, according to the method, a pay table is created such as the pay table illustrated in FIG. 8A. The Total Payout is then calculated by adding the total payouts from the pay table for all the possible hands.

Next, according to the method the Total Payouts For This Hand, in this example the game situation 4(H) A(H) K(S) T(S) J(S), is set to zero. Then, each hold code is assigned the binary number associated with that hold code; for example 0 0 0 0 0 is 0, 0 0 0 0 1 is 1, 1 1 1 1 1 is 31, etc. Then, the method includes starting with hold code 1 and setting the Total Payouts For This Hold Code to zero.

Next, the method requires the evaluation every possible outcome for this hold code applied to this hand or game situation and adding the payout for all these possible outcomes. For example, several outcomes yield a payout for hold code number 7 or 0 0 1 1 1 when applied to the game situation 4(H) A(H) K(S) T(S) J(S). Forty-five outcomes yield a flush. According to the pay table a flush has a payout of six. These flush outcomes contribute forty-five times six, or two hundred seventy to the Total Payouts For This Hold Code. Also, nine outcomes yield a three-of-a-kind, each with a payout of three, contributing a total of twenty-seven to the Total Payouts For This Hold Code. Twenty-seven outcomes yield a jacks or better, each with a payout of two, contributing a total of fifty-four to the Total Payouts For This Hold Code. Finally, one hundred twenty-nine outcomes yield a two-pair, each with a payout of one, contributing a total of one hundred twenty-nine to the Total Payouts For This Hold Code. Thus, the Total Payouts For This Hold Code is four hundred eighty.

According to the method, the Expected Value for a hold code is the Total Payouts For This Hold Code divided by the total possible outcomes for the hold code. In this example, hold code 7 or 0 0 1 1 1 has Choose (47, 2) or 47!/(45!* 2!) or 1081 possible outcomes. Thus, the Expected Value for hold code 7 is 480/1081 or 0.444.

According to the method, after performing the above steps for all the hold codes numbered 1 through 31, the Expected Value for hold code number zero or 0 0 0 0 0 for the game situation 4(H) A(H) K(S) T(S) J(S) is calculated. According to the method, the Total Payouts For This Hold Code for hold code zero is equal to Total Payouts minus Total Payouts For This Hand. The Expected Value is then the Total Payouts For This Hold Code divided by the total possible outcomes. For hold code zero, there are Choose (47, 5) or 1,533,939 possible outcomes. Using this method of calculating the Expected Value for hold code number zero eliminates the need to calculate 1,533,939 out of 2,598,960 total possible outcomes, or 59% of the total possible outcomes. This a significant reduction in the processing needed to calculate a mathematically precise table. The above example is repeated for every possible hand or game situation to complete the auto-hold table.

If creating an auto-hold table providing the hold codes for the best chance to obtain a winning combination from the draw, the above method applies except to include calculating a Winning Combination Value instead of an Expected Value. In this embodiment, the method includes adding up the number of possible outcomes that create a winning combination for that particular hold code and dividing by the total number of possible outcomes. This value is the Winning Combination Value for that hold code.

To compute the Winning Combination Value for the hold code indicating to hold nothing or 0 0 0 0 0, the method includes adding the number of winning combinations for all the other hold codes and subtracting this value from the total number of possible winning outcomes. The method then includes dividing this value by the total number of possible winning outcomes; this value is the Winning Combination Value of hold code 0 0 0 0 0. The hold code with the highest Winning Combination Value for the game situation is stored in the auto-table table. The method of creating the auto-hold table includes repeating this process for each auto-hold table index until the table is complete. It should be appreciated that different methods of creating an auto-hold table for different hold strategies can also be used.

This exhaustive calculation of the mathematically optimal or best suggestions for what to hold for any game situation only needs to be performed once for each game or pay table. After being calculated, the table is stored in data storage device 40 and can be accessed by gaming machine 10 during game play without any further calculation. Furthermore, when a redundancy table is used, the number of calculations necessary to create the auto-hold table is reduced because only one calculation is needed for the hands or game situations that are the same but for the suit. Another advantage is that by using the temporary pay table, as noted above, the processing needed to calculated the Expected Value or Winning Combination Value for hold code 0 0 0 0 0 is greatly reduced.

It should be appreciated that the above method of creating a mathematically precise auto-hold table can be applied to blackjack games or poker games with different numbers of cards or other types of decks such as using wild cards, jokers, or multiple decks. Further, the method can be applied to slot-type games where one or more reels can be held before re-spinning the others. To be applied, the method needs a finite number of possible outcomes, and the finite number of possible outcomes must be within a reasonable size to be stored in data storage device 40. The sizes of the master and redundancy tables will vary, but the methods of creating and using the tables remain applicable.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming device comprising:

a game;

a plurality of game situations, wherein at least one of said game situations occurs after the start of play of said game which requires player input to continue the game;

a plurality of hold codes, wherein each hold code provides a mathematically optimal suggestion of how to continue the game at the occurrence of one of the game situations to obtain an optimal outcome from a plurality of outcomes associated with each said game situation;

a hold code index associated with each game situation, wherein said game situations with a redundant plurality of possible outcomes have the same hold code index;

a data storage device which stores the plurality of hold codes and hold code indexes;

a player input device; and a processor operable with the data storage device and the player input device to: (a) generate at least one of the game situations; (b) enable a player to make an input; (c) determine the hold code index associated with the generated game situation; (d) determine the hold code associated with said hold code index; (e) indicate said hold code to the player; and (f) enable the player to accept or reject the hold code.

2. The gaming device of claim 1, wherein each game situation includes a plurality of elements and the processor is operable with the data storage device to order the elements of the generated game situation prior to determining the hold code.

3. The gaming device of claim 1, wherein at least two game situations occur during a single play of the game.

4. The gaming device of claim 1, wherein at least one pay table is associated with the game, and each hold code provides a mathematically optimal suggestion of how to continue the game to obtain an optimal outcome from a plurality of outcomes associated with each game situation and pay table.

5. The gaming device of claim 1, which includes at least two games, a plurality of game situations associated with each game, and wherein each hold code provides a mathematically optimal suggestion of how to continue the game to obtain an optimal outcome from a plurality of outcomes associated with each game situation and said game.

6. The gaming device of claim 5, wherein at least one pay table is associated with each game, and each hold code provides a mathematically optimal suggestion of how to continue the game to obtain an optimal outcome from a plurality of outcomes associated with each game situation, game and pay table.

7. The gaming device of claim 1, wherein the processor enables the player to choose one of at least two sets of hold codes to apply to each game situation, wherein each set of hold codes corresponds to a different hold strategy.

8. The gaming device of claim 1, wherein the game is poker and the game situation is a set of cards displayed to the player, wherein the player must choose which of said cards to hold and which of said cards to discard.

9. The gaming device of claim 1, wherein the game is a slot-type game and the game situation occurs after a spin of the reels, wherein the player must choose which reels, if any, to hold before re-spinning the other reels.

10. The gaming device of claim 1, wherein the game is blackjack and the game situation is a set of cards displayed to the player, wherein the player must choose whether or not to take an additional card.

11. A gaming device comprising:

at least one game apparatus;

a game associated with each game apparatus;

a plurality of game situations associated with each game, wherein at least one of the plurality of game situations occurs after the start of play of said game which requires player input to continue the game;

a plurality of hold codes, wherein each hold code provides a mathematically optimal suggestion of how to continue a played game at the occurrence of one of the game situations to obtain an optimal outcome from a plurality of outcomes associated with each said game situation;

a hold code index associated with each game situation, wherein said game situations with a redundant plurality of possible outcomes have the same hold code index;

a data storage device which stores the plurality of hold codes and the hold code indexes;

a player input device; and a processor operable with the data storage device and the player input device to: (a) generate one of the game situations; (b) enable a player to make an input; (c) determine the hold code index associated with the generated game situation; (d) determine the hold code associated with said hold code index; (e) indicate the hold code to the player; and (f) enable the player to accept or reject the hold code.

12. The gaming device of claim 11, wherein the at least one game apparatus is at least one virtual deck of cards.

13. The gaming device of claim 11, wherein the at least one game apparatus is at least one set of slot reels.

14. The gaming device of claim 11, wherein each game situation includes a plurality of elements and the processor is operable with the data storage device to order the elements of the generated game situation prior to determining the hold code.

15. The gaming device of claim 11, wherein at least two game situations occur during a single play of one game.

16. The gaming device of claim 11, wherein at least two games are associated with each game apparatus, and each hold code provides a mathematically optimal suggestion of how to continue the game to obtain an optimal outcome from a plurality of outcomes associated with each game situation, game, and game apparatus.

17. The gaming device of claim 16, wherein at least one pay table is associated with each game, and each hold code provides a mathematically optimal suggestion of how to continue the game to obtain an optimal outcome from a plurality of outcomes associated with each game situation, game, game apparatus, and pay table.

18. The gaming device of claim 11, wherein at least one pay table is associated with each game, and each hold code provides a mathematically optimal suggestion of how to continue the game to obtain an optimal outcome from a plurality of outcomes associated with each game situation, game apparatus and pay table.

19. The gaming device of claim 11, wherein the processor enables the player to choose one of at least two sets of hold codes to apply to each game situation, wherein each set of hold codes corresponds to a different hold strategy.

20. The gaming device of claim 12, wherein the game is poker and the game situation is a set of cards displayed to the player, wherein the player must choose which cards to hold and which cards to discard.

21. The gaming device of claim 12, wherein the game is blackjack and the game situation is a set of cards displayed to the player, wherein the player must choose whether or not to take an additional card.

22. A gaming device comprising:

a game;

a plurality of game situations, wherein at least one of said game situations occurs after the start of play of said game which requires player input to continue the game;

a plurality of possible outcomes associated with each game situation;

a hold code index associated with each game situation, wherein said game situations with a redundant plurality of possible outcomes have the same hold code index;

a plurality of hold codes, wherein each hold code provides a mathematically optimal suggestion of how to continue the game at the occurrence of each game situation to obtain an optimal outcome from a plurality of outcomes associated with each said game situation;

a data storage device which stores the plurality of hold codes and the hold code indexes;

a player input device; and a processor operable with the data storage device and the player input device to: (a) generate at least one of the game situations; (b) enable a player to make an input; (c) determine the hold code index associated with the generated game situation; (d) determine the hold code associated with said hold code index; (e) indicate said hold code to the player; and (f) enable the player to accept or reject the hold code.

23. The gaming device of claim 22, wherein each game situation includes a plurality of elements and the processor is operable with the data storage device to order the elements of the generated game situation prior to determining the hold code index.

24. The gaming device of claim 22, wherein at least two game situations occur during a single play of the game.

25. The gaming device of claim 22, wherein at least one pay table is associated with the game, and each hold code provides a mathematically optimal suggestion of how to continue the game to obtain an optimal outcome from a plurality of outcomes associated with each game situation and pay table.

26. The gaming device of claim 22, which includes at least two games, a plurality of game situations associated with each game, and wherein each hold code provides a mathematically optimal suggestion of how to continue the game to obtain an optimal outcome from a plurality of outcomes associated with each game situation and game.

27. The gaming device of claim 26, wherein at least one pay table is associated with each game, and each hold code provides a mathematically optimal suggestion of how to continue the game to obtain an optimal outcome from a plurality of outcomes associated with each game situation, game and pay table.

28. The gaming device of claim 22, wherein the processor enables the player to choose one of at least two sets of hold codes to apply to each game situation, wherein each set of hold codes corresponds to a different hold strategy.

29. The gaming device of claim 22, wherein the game is poker and the game situation is a set of cards displayed to the player, wherein the player must choose which of said cards to hold and which of said cards to discard.

30. The gaming device of claim 22, wherein the game is a slot-type game and the game situation occurs after a spin of the reels, wherein the player must choose which reels, if any, to hold before re-spinning the other reels.

31. The gaming device of claim 22, wherein the game is blackjack and the game situation is a set of cards displayed to the player, wherein the player must choose whether or not to take an additional card.

32. A gaming device comprising:

at least one virtual deck of cards;

a game associated with each virtual deck of cards;

a plurality of game situations associated with each game, wherein at least one of the plurality of game situations occurs after the start of play of said game which requires player input to continue the game;

a plurality of possible outcomes associated with each game situation;

a hold code index associated with each game situation, wherein said game situations with a redundant plurality of possible outcomes have the same hold code index;

a plurality of hold codes wherein each hold code provides a mathematically optimal suggestion of how to continue a played game at the occurrence of each game situation to obtain an optimal outcome from a plurality of outcomes associated with each said game situation;

a data storage device which stores the plurality of hold codes and the hold code indexes;

a player input device; and a processor operable with the data storage device and the player input device to: (a) generate one of the game situations; (b) enable a player to make an input; (c) determine the hold code index associated with the generated game situation; (d) determine the hold code associated with said hold code index; (e) indicate the hold code to the player; and (f) enable the player to accept or reject the hold code.

33. The gaming device of claim 32, wherein each game situation includes a plurality of elements and the processor is operable with the data storage device to order the elements of the generated game situation prior to determining the hold code index.

34. The gaming device of claim 32, wherein at least two game situations occur during a single play of one game.

35. The gaming device of claim 32, wherein at least two games are associated with each virtual deck of cards, and each hold code provides a mathematically optimal suggestion of how to continue the game to obtain an optimal outcome from a plurality of outcomes associated with each game situation, game, and deck of cards.

36. The gaming device of claim 35, which includes at least one pay table associated with each game, and each hold code provides a mathematically optimal suggestion of how to continue the game to obtain an optimal outcome from a plurality of outcomes associated with each game situation, game, deck of cards, and pay table.

37. The gaming device of claim 32, wherein the processor enables the player to choose one of at least two sets of hold codes to apply to each game situation wherein each set of hold codes corresponds to a different hold strategy.

38. The gaming device of claim 32, which includes at least one pay table associated with each game, and each hold code provides a mathematically optimal suggestion of how to continue the game to obtain an optimal outcome from a plurality of outcomes associated with each game situation, deck of cards and pay table.

39. The gaming device of claim 32, wherein the game is poker and the game situation is a set of cards displayed to the player, wherein the player must choose which cards to hold and which cards to discard.

40. The gaming device of claim 32, wherein the game is blackjack and the game situation is a set of cards displayed to the player, wherein the player must choose whether or not to take an additional card.

41. A gaming device comprising:

a game having at least one set of slot reels;

at least one pay table associated with each set of slot reels;

a plurality of game situations associated with each set of slot reels, wherein at least one of the plurality of game situations occurs after the start of play of said game which requires player input to continue the game;

a plurality of possible outcomes associated with each game situation;

a hold code index associated with each game situation, wherein said game situations with a redundant plurality of possible outcomes have the same hold code index;

a plurality of hold codes wherein each hold code provides a mathematically optimal suggestion of how to continue a played game at the occurrence of each game situation to obtain an optimal outcome from a plurality of outcomes associated with each said game situation and pay table;

a data storage device which stores the plurality of hold codes and the hold code indexes;

a player input device; and a processor operable with the data storage device and the player input device to: (a) generate one of the game situations; (b) enable a player to make an input; (c) determine the hold code index associated with the generated game situation; (d) determine the hold code associated with said hold code index; (e) indicate the hold code to the player; and (f) enable the player to accept or reject the hold code.

42. The gaming device of claim 41, wherein each game situation includes a plurality of elements and the processor is operable with the data storage device to order the elements of the generated game situation prior to determining the hold code index.

43. The gaming device of claim 41, wherein at least two game situations occur during a single play of the game.

44. The gaming device of claim 41, wherein at least two games are associated with each set of slot reels, and each hold code provides a mathematically optimal suggestion of how to continue the game to obtain an optimal outcome from a plurality of outcomes associated with each game situation, game, pay table, and set of slot reels.

45. The gaming device of claim 41, wherein the processor enables the player to choose one of at least two sets of hold codes to apply to each game situation wherein each set of hold codes corresponds to a different hold strategy.

46. A method of operating a gaming device, the method comprising the steps of:

(a) enabling a player to play at least one game;

(b) generating at least one game situation from a plurality of different game situations after the start of a single play of said game which requires player input to continue said game;

(c) converting the game situation into a unique number;

(d) determining an auto-hold table index associated with the unique number;

(e) determining from an auto-hold table a hold code associated with the auto-hold table index wherein the hold code indicates a mathematically optimal input for the player to continue the game to obtain an optimal outcome from a plurality of possible outcomes, wherein the game situations with a redundant plurality of possible outcomes have the same auto-hold table index; and (f) displaying the hold code to the player.

47. The method of claim 46, which includes a plurality of elements associated with each game situation, and includes the step of ordering the elements of the game situation in a data storage device before converting the game situation into a unique number.

48. The method of claim 46, including the step of enabling the player to accept or reject the hold code.

49. The method of claim 46, including the step of enabling the player to select which game to play, which of at least one pay table to apply and which type of at least one hold strategy to utilize for the hold code.

50. A method of operating a gaming device, the method comprising the steps of:

(a) enabling a player to play a game;

(b) generating at least one game situation after the start of a single play of said game where player input is necessary to continue said game;

(c) converting the game situation into a unique number;

(d) retrieving from a master table an auto-hold table index associated with the unique number;

(e) retrieving from the auto-hold table using the auto-hold table index a hold code that indicates a mathematically optimal input for the player to continue the game to obtain an optimal outcome from a plurality of possible outcomes, wherein the game situations with a redundant plurality of possible outcomes have the same auto-hold table index; and (f) displaying the hold code to the player.

51. The method of claim 50, which includes a plurality of elements associated with the game situation, and includes the step of ordering the elements of the game situation in a data storage device before converting the game situation into a unique number.

52. The method of claim 50, including the step of enabling the player to accept or reject the hold code.

53. The method of claim 50, including the step of enabling the player to select which game to play, which of at least one pay table to apply and which type of at least one hold strategy to utilize for the hold code.

54. A method of creating an auto-hold table that stores a plurality of hold codes that indicate a mathematically optimal suggestion for playing each of a plurality of possible game situations during a game to obtain the optimal of a plurality of game outcomes, wherein the game situations with a redundant plurality of possible outcomes have a same auto-hold table index, the method comprising the steps of:

(a) converting an index number of the auto-hold table into one of the game situations associated with the game;

(b) calculating a value for each hold code when said hold code is applied to said game situation;

(c) storing the hold code with the highest value in the auto-hold table under the index number (d) repeating steps (a) through (c) until each of the possible game situations has a corresponding index number in the auto-hold table; and (e) storing the auto-hold table in a data storage device.

55. The method of claim 54, wherein calculating the value for each hold code but a hold code indicating to hold nothing includes the steps of assigning a payout to every possible game outcome, calculating every possible game outcome for the hold code and said game situation, adding the payouts for every possible game outcome for the hold code and said game situation creating a Total Possible Payouts, and dividing the Total Possible Payouts by the total number of possible game outcomes for the hold code.

56. The method of claim 55, wherein calculating the value for the hold code indicating to hold nothing includes the steps of assigning a payout to every possible game outcome, adding the payouts of all the possible game outcomes, adding the total payouts for all the other hold codes, subtracting the total payouts for all the other hold codes from the total payouts of all possible game outcomes creating a Total Payouts Value, and dividing the Total Payouts Value by the total number of outcomes for the hold code indicating to hold nothing.

57. The method of claim 54, wherein each of the possible hold codes but one includes the steps of assigning a payout to every possible game outcome, adding the number of possible outcomes that create a winning combination for the hold code to create a Total Winning Outcomes Value, and dividing the Total Winning Outcomes Value by the total number of possible outcomes for the hold code.

58. The method of claim 57, wherein calculating the value for the hold code indicating to hold nothing includes the steps of adding the number of winning combinations for all the other hold codes, subtracting the total number of possible winning outcomes creating an Other Winning Outcomes Value, and dividing the Other Winning Outcomes Value by the total number of possible winning outcomes.

59. A method of creating a master table for use with an auto-hold table to provide a plurality of hold codes for use during the play of a game, the method comprising the steps of:

(a) setting a current index number of the master table to zero;

(b) setting a current index number of the auto-hold table to zero;

(c) converting the current index number of the master table into one of a plurality of game situations associated with the game wherein a set of possible outcomes is associated with each game situation;

(d) changing said game situation to obtain a different game situation that has a redundant set of possible outcomes in relation to said game situation;

(e) computing a new master table index for each said different game situation created by step (d);

(f) if the new master table index is less than the current index number of the master table, retrieving an auto-hold table index associated with the new master table index and entering said auto-hold table index in the master table at the current index number of the master table;

(g) if the new master table index is not less than the current index number of the master table, entering the current index number of the auto-hold table into the master table at the current index number of the master table and incrementing the current index number of the auto-hold table;

(h) incrementing the current index number of the master table; and (i) repeating steps (c) through (h) until the current index number of the master table matches the total possible number of game situations.

* * * * *